United States Patent [19]

Washo et al.

[11] Patent Number: 4,527,865
[45] Date of Patent: Jul. 9, 1985

[54] ELECTROCHROMIC DISPLAY DEVICE

[75] Inventors: Junichi Washo, Yamatokoriyama; Takaaki Miyazaki, Nara; Mitsuo Ishii, Yamatokoriyama; Muneo Nakayama, Tokyo; Akira Hashimoto, Yokohama; Toshihiro Nishimura, Kawasaki, all of Japan

[73] Assignees: Sharp Kabushiki Kaisha, Osaka; Tokyo Ohka Kogyo Co., Ltd., Kanagawa, both of Japan

[21] Appl. No.: 579,006

[22] Filed: Feb. 15, 1984

Related U.S. Application Data

[63] Continuation of Ser. No. 275,387, Jun. 19, 1981, abandoned.

[30] Foreign Application Priority Data

Jun. 23, 1980 [JP] Japan ................................. 55-85385

[51] Int. Cl.$^3$ ............................................. G02F 1/17
[52] U.S. Cl. ................................... 350/357; 350/336; 350/363
[58] Field of Search ............... 350/357, 336, 353, 355, 350/363; 427/108

[56] References Cited

U.S. PATENT DOCUMENTS 4,238,276 12/1980 Kinugawa et al. ................. 427/108
4,240,713 12/1980 Leibowitz ........................... 350/357

FOREIGN PATENT DOCUMENTS 82442 7/1978 Japan ................................... 427/108

Primary Examiner—James W. Davie
Attorney, Agent, or Firm—Birch, Stewart, Kolasch & Birch

[57] ABSTRACT

An electrochromic display device comprising a transparent substrate and a counter substrate sealingly joined together to define a cell for accommodating an electrolyte, a transparent electroconductive layer on an inner surface of the transparent substrate, a display electrode layer overlaying the transparent electroconductive layer and a counter electrode layer deposited on an inner surface of the counter substrate is featured by the provision of a transparent insulating layer between the transparent substrate and the transparent electroconductive layer.

1 Claim, 1 Drawing Figure

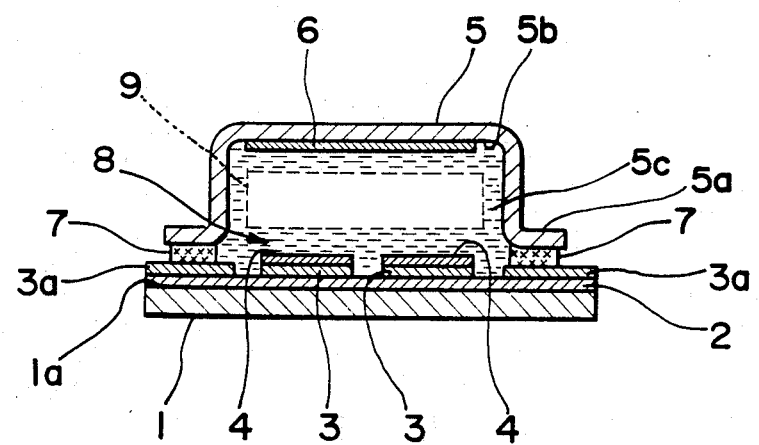

ELECTROCHROMIC DISPLAY DEVICE

This application is a continuation, of application Ser. No. 275,387 filed on June 19, 1971, now abandoned.

BACKGROUND OF THE INVENTION

The present invention relates to an electrochromic display device.

A display device utilizing an electrochromic phenomenon to display a desired or predetermined pattern is known as an electrochromic display device. The conventional electrochromic display device comprises, in general, an electrolyte filled in a confined space defined between a glass substrate and a counter-substrate, a transparent electroconductive layer deposited on an inner surface of the glass substrate in a configuration corresponding to a pattern to be displayed, and an electrochromic electrode layer made of a material capable of exhibiting an electrochromic phenomenon and deposited on the transparent electroconductive layer on one side opposite to the glass substrate.

In this conventional electrochromic display device, or ECD device, the transparent electroconductive layer is formed directly on the glass substrate in the form of a patterned electrode arrangement whereas the electrochromic electrode layer, or EC electrode layer, is formed by either vapor-depositing or sputtering a solid electrochromic material.

Both the vapor-deposition technique and the sputtering technique require the employment of a complicated and expensive vacuum pump as well as a complicated and time-comsuming process handling. In view of this, there has been proposed a method for forming the EC electrode layer on the transparent electroconductive layer on the glass substrate, which method comprises applying a solution, containing dissolved therein a composition such as a material capable of exhibiting the electrochromic phenomenon when baked, to the transparent electroconductive layer and then baking the coating of the applied solution.

However, since in the manufacture of the ECD device, the transparent electroconductive layer is formed directly on the glass substrate in the form of a patterned electrode arrangement as hereinbefore described, an EC electrode layer is formed directly on the glass substrate at an area where no pattern is formed. If a display pattern is to be formed by etching the EC layer as is, the etching speeds for etching off the EC layer formed directly on the glass substrate and for etching off the EC layer on the transparent electroconductive layer, respectively, vary from each other. This is particularly true where the etching is carried out by the employment of a dry etching method such as sputtering etching and plasma etching techniques. This results not only in reduced definition of the pattern to be, or being, displayed, but also in an increased possibility of blackening of the transparent electroconductive layer during the practice of the etching.

Similar problems as discussed above are also present in the practice of the baking method used to form the EC layer. Specifically the employment of the baking method results in the formation of the EC electrode layer directly on the glass substrate at an area where no pattern is formed and, if the EC layer is baked while it is, burning or evaporation of an unnecessary portion (i.e., not patterned portion) of the EC layer would take place unevenly under the influence of a glass, resulting not only in reduced definition of the pattern to be, or being, displayed, but also in formation of a matter which would disturb the function of the EC material.

SUMMARY OF THE INVENTION

The present invention has been developed with a view to substantially eliminating the above described disadvantages and inconveniences. An essential object of the present invention resides in enabling the EC layer to be formed by applying or coating onto the transparent electroconductive layer a solvent-soluble material containing either one of organic and inorganic metallic compounds so that the patterning of the EC electrode layer so formed or formed according to the conventional method by the use of the vapor deposition or sputtering technique can be facilitated by the employment of the dry etching method.

The above described object of the present invention can be accomplished by providing a transparent insulating layer between the transparent electroconductive layer and the transparent substrate.

BRIEF DESCRIPTION OF THE DRAWING

These and other objects and features of the present invention will become apparent from the following description made with reference to the accompanying drawing which shows a cross-sectional representation of an ECD device embodying the present invention.

DETAILED DESCRIPTION OF THE INVENTION

Referring to the accompanying drawing, an ECD device comprises a generally elongated rectangular transparent substrate 1 of, for example, soda-lime glass having one surface 1a on which a transparent insulating layer 2 made of, for example, silicon oxide ($SiO_2$) and having a thickness of about 1000 Å, is formed, a plurality of, for example, seven-segment transparent electroconductive layer 3 overlaying the insulating layer 2 and arranged in a pattern corresponding to, or so as to represent, the shape of a figure of "8", and display electrode layers 4 equal in number to the number of the electroconductive layers 3.

The transparent electroconductive layer 3 are made of, for example, indium oxide ($In_2O_3$) in a thickness of about 1200 Å and are deposited on the insulating layers 2 in spaced relation by the use of any known vapor deposition technique. These electroconductive layers 3 have respective terminal members 3a leading out from the corresponding electroconductive layers 3 with their free ends arranged on a peripheral portion of the substrate 1 for external electrical connection.

The display electrode layers 4 are made of a material containing, or contain, for example, tungsten oxide ($WO_3$) capable of exhibiting a known electrochromic phenomenon, and formed on the respective electroconductive layers 3 in a pattern identical to the pattern in which the layers 3 are arranged. The formation of these display electrode layers 4 is carried out by applying a coating solution, prepared in a manner as will be described later, to the transparent electroconductive layers 3 on the substrate 1 to form a coating of a predetermined thickness and then baking it at a predetermined temperature. Alternatively, the formation of these layers 4 may be carried out by the use of any known method, for example, a known vapor deposition method.

The ECD device also comprises a counter-substrate 5, which, illustratively, is formed from a plate of stainless steel, initially larger in size than the substrate 1, by the use of any known press work and is shaped to represent a cup having a peripheral flange 5a, a recess 5c, and a counter electrode layer 6 formed on a rectangular surface area 5b of the counter-substrate 5 which corresponds to the bottom of the recess 5c of the cup and which faces the transparent electroconductive layer 3. This counter-substrate 5 is mounted on the substrate 1 with its peripheral flange 5a tightly sealed to the peripheral portion of the substrate 1 by means of a sealant 7 of, for example, epoxy resin in such a manner that the surface area 5b where the counter electrode 6 is formed extends in parallel relation to the substrate 1. A known electrolyte 8 is filled in a cell defined between the substrate 1 and the counter-substrate 5. It is to be noted that the counter-substrate 5 may be of a plate-like shape instead of the cup-like shape and that a background plate 9 made of alumina may be disposed in the electrolyte 8 in a manner as shown by the broken line simultaneously with the employment of a white powder of titanium oxide mixed in the electrolyte 8 for the purpose of enhancing the contrast of a pattern presented in color by some or all of the EC electrode layers 4 when the ECD device is electrically driven.

Hereinafter, some methods for the formation of the EC electrodes 4 on the corresponding transparent electroconductive layers 3 on the substrate 1 will be described.

EMBODIMENT I 10 g of phosphorous tungstic acid is added to 10 g of acetone at room temperature, the mixture being stirred for about 10 minutes to dissolve the phosphorous tungstic acid into the acetone. The resultant solution is then added with 50 g of a solution, prepared by mixing 15% by weight of polyvinyl butyral in ethyl alcohol, and subsequently with 80 g of ethylene glycol monoethyl ether acetate to provide a coating solution.

The substrate made of soda-lime glass of 1.1 mm in thickness and having the insulating layer 2 and the transparent electroconductive layers 3 is immersed in the coating solution so prepared as hereinabove described and is then drawn out of the coating solution at a drawing speed of, for example, 40 cm/min. the substrate 1 so drawn out of the coating solution has a coating of the coating solution applied over the entire surface thereof. Thereafter, the substrate 1 is heated for about 10 minutes at about 500° C. under atmospheric pressure to bake the coated layer on the substrate 1.

Subsequent to the heating step, a portion of the baked coating, about 5000 Å in thickness, which is not occupied by, and does not overlay, the transparent electroconductive layers 3 on the substrate 1, is removed by the use of any known etching technique, thereby completing the formation of the EC electrode layers 4 on the corresponding electroconductive layers 3.

EMBODIMENT II 10 g of phosphorous tungstic acid is added to 20 g of ethyl acetate at room temperature, the mixture being stirred for 10 minutes to dissolve the phosphorous tungstic acid into the ethyl acetate. The resultant solution is then added with 10 g of 10% of ethyl alcohol and ethyl acetate solution containing silicon oxide ($SiO_2$), 40 g of 20% methanol solution containing ethyl cellulose and 20 g of ethylene glycol monomethyl ether to provide a coating solution.

The substrate 1 made of soda-lime glass of 1.1 mm in thickness and having the insulating layer 2 and the transparent electroconductive layers 3 is immersed in the coating solution so prepared and is then drawn out of the coating solution at a drawing speed of, for example, 50 cm/min. The substrate so drawn out of the coating solution has a coating of the coating solution applied over the entire surface thereof, which coating is thereafter baked for about 15 minutes at about 500° C. in a manner similar to the foregoing embodiment. The substrate is then treated in a manner similar to the foregoing embodiment to form the EC electrode layers 4 on the corresponding electroconductive layers 3 of 4200 Å in thickness.

It is to be noted that the thickness of the EC electrode layers 4 according to the embodiment II may vary depending on the drawing speed at which the substrate immersed in the coating solution in the embodiment II is drawn out of the coating solution, as follows.

| Drawing Speed (cm/min) | 10 | 20 | 30 | 40 | 50 |
|---|---|---|---|---|---|
| Thickness (Å) | 1300 | 2000 | 2850 | 3600 | 4200 |

EMBODIMENT III 10 g of pentaethoxy tungstate is added to 150 g of n-butanol, the mixture being stirred for about an hour to dissolve the pentaethoxy tungstate. The resultant solution is then added with 2 g of pyroxylin to provide a coating solution.

The substrate 1 made of soda-lime glass of 1.1 mm in thickness and having the insulating layer 2 and the transparent electroconductive layer 3 is immersed in the coating solution so prepared and is then drawn out of the coating solution at a drawing speed of, for example, 30 cm/min. The substrate 1 so drawn out of the coating solution has a coating of the coating solution applied over the entire surface thereof. Thereafter, the baking step is performed for about 10 minutes at about 500° C. and, in a manner similar to that described in connection with the foregoing embodiments, the known etching technique is employed to complete the formation of the EC electrode layers 4, 2500 Å in thickness, on the corresponding electroconductive layer 3.

When the products ECD-I, ECD-II and ECD-III, all identical in construction to that shown in the accompanying drawing, but wherein the EC electrode layers 4 had been formed according to the embodiments I, II and III, respectively, were electrically driven, they exhibited such electrochromic characteristics as tabulated below.

TABLE 1

|  | Color Displayed | Contrast |
|---|---|---|
| ECD - I | Deep blue | Excellent |
| ECD - II | Deep blue | Excellent |
| ECD - III | Deep blue | good |

The transparent insulating layer 2 on the transparent substrate 1 used in each of the products ECD-I, ECD-II and ECD-III was made of silicon oxide ($SiO_2$) in a thickness of 1000 Å while the transparent electroconductive layers 3 on the substrate 1 used in each of such products were made of indium oxide ($In_2O_3$) in a thickness of 1200 Å.

Similarly, the formation of the $WO_3$ thin layer using a vacuum pump will now be described.

EMBODIMENT IV

Formation by Sputtering

The $WO_3$ thin layer is formed on the substrate by means of a high frequency sputtering method wherein a high purity $WO_3$ (Purity: 99.99%) prepared by sintering is used as a target. The process consists of placing the $WO_3$ target and the ECD substrate in face-to-face relation to each other within a sputtering device, preliminarily exhausting air inside the device to establish an atmosphere of about $3 \times 10^{-6} \sim 5 \times 10^{-6}$ Torr inside the device and initiating the sputtering under the following conditions at the time of completion of the exhaust of the air.

| | |
|---|---|
| Pressure under which argon and oxygen gases are introduced: | $2 \times 10^{-2}$ Torr |
| High Frequency Power: | 160 W |
| Substrate - Target Spacing: | 4.5 cm |

The speed of formation of the thin layer is inevitably determined by the area of the target, the spacing between the target and the substrate, the high frequency power and the gas pressure. The employment of the above listed conditions in combination with the use of the target of 85 mm in diameter has resulted in the formation of the thin layer at a rate of 100 Å/min.

EMBODIMENT V

Formation by Electron Beam Vapor Deposition

By using as a volatile a pellet of $WO_3$ prepared either by sintering a powder of $WO_3$ or by molding with the use of a tablet compressing machine, the vapor deposition based on an electron beam radiation is effected to form the $WO_3$ thin layer on the substrate. At this time, both the $WO_3$ pellet and the substrate are placed inside a device which is subsequently preliminarily exhausted to establish an atmosphere of about $2 \times 10^{-5}$ Torr inside the device as is the case with that in the formation of the $WO_3$ thin layer by the sputtering technique. Thereafter, the electron beam deposition is effected while the substrate is heated by a heater positioned on the backside face of the substrate.

The vapor depositing conditions are as follows.

| | |
|---|---|
| Substrate Heating Temp.: | 300° C. |
| Substrate-Volatile Distance: | 35 cm |
| Electron Beam Volt.: | 6~7 kV |
| Electron Beam Current: | 15 mA |
| Depositing Speed: | 50 Å/sec |

It has been found that the $WO_3$ thin layer attains a thickness of about 5000 Å in 2 minutes.

EMBODIMENT VI

Formation by Vacuum Deposition

A procedure of placing a block of high purity $WO_3$ (Purity: 99.99%), prepared by compressing a powder of $WO_3$ with the use of a tablet compressing machine, on a metallic boat of tungsten, molybdenum or tantalum, supplying an electric current through the metallic boat under vacuum atmosphere, and resistance-heating the $WO_3$ block to cause the latter to evaporate to deposit the $WO_3$ thin film is similar to that in the formation by the electron beam technique wherein both the $WO_3$ sample and the substrate are placed inside the device, the device is then preliminarily exhausted and the substrate is thereafter heated, the depositing conditions being, however, as follows:

| | |
|---|---|
| Substrate Heating Temp.: | 300° C. |
| Substrate-Volatile Distance: | 25 cm |
| Pressure under which oxygen gas is introduced: | $2 \times 10^{-4}$ Torr |
| Depositing Speed: | 120~160 Å/min |

It is to be noted that the depositing speed is determined by the electric current supplied through the metallic and is about 100 Å in this embodiment.

A means for forming the $WO_3$ thin layer, deposited according to any one of the embodiments IV, V and VI, into a display pattern may be a method wherein the formation is carried out simultaneously with a vapor deposition while a metallic mask has been tightly placed on the transparent electroconductive layer, on the removal of an unnecessary portion either by the employment of an etching technique which is to be performed in an alkaline bath after the masking has been effected by the use of a resist ink subsequent to the $WO_3$ deposition or by the employment of a sputtering etching or plasma etching technique which is to be effected using a reactive vessel subsequent to the $WO_3$ vapor deposition.

Display characteristics are tabulated in Table 2.

TABLE 2

| Embodiment | Color Displayed | Contrast |
|---|---|---|
| IV | Deep Blue | Excellent |
| V | Deep Blue | Excellent |
| VI | Deep Blue | Excellent |

With respect to the presence of an etching residue left unremoved during the $WO_3$ etching, the provision of the insulating layer beneath the transparent electroconductive layer according to the present invention is effective to minimize it drastically as shown in Table 3.

Experiments to find the residue were conducted in the following manner under the following conditions.

A sputtering etching was effected to the transparent insulating layer of $SiO_2$, 1000 Å in thickness, for 10 minutes under an etching pressure of $2 \times 10^2$ -Torr while a reactive gas of $CCl_4$ was supplied at a rate of 10 cc/min and a 200 W high frequency electrical power was applied. A plasma etching was effected for 25 minutes under an etching pressure of $5 \times 10^{-1}$ Torr while a reactive gas of $CCl_4$ was supplied at a rate of 10 cc/min and a 150 W high frequency electric power was applied. The substrate used was the one made of a commercially available soda-lime glass and having the patterned transparent electroconductive layers of indium oxide deposited thereon in a thickness of 1200 Å.

TABLE 3

| | Etching Methods | | | |
|---|---|---|---|---|
| Formation of $WO_3$ | Sputtering Etching | | Plasma Etching | |
| Thin Layer | $SiO_2$ Used | $SiO_2$ Not Used | $SiO_2$ Used | $SiO_2$ Not Used |
| Embodiment | | | | |
| I | No Residue | Residue | No Residue | Residue |
| II | " | " | " | " |
| III | " | " | " | " |
| IV | " | " | " | " |
| V | " | " | " | " |

TABLE 3-continued

| Formation of WO₃ Thin Layer | Etching Methods | | | |
|---|---|---|---|---|
| | Sputtering Etching | | Plasma Etching | |
| | SiO₂ Used | SiO₂ Not Used | SiO₂ Used | SiO₂ Not Used |
| VI | " | " | " | " |

It is to be noted that the term "Residue" used in Table 3 means that, even though the removal of the WO₃ on the transparent electroconductive layer is possible, the WO₃ residue remains unremoved on the glass substrate because of incomplete etching.

As hereinbefore described, one of essential features of the present invention resides in that the display electrode layer capable of exhibiting the electrochromic phenomenon is formed by providing the transparent insulating layer between the transparent display substrate and the transparent electroconductive layer, coating a solvent-soluble material containing the organic or inorganic metallic compound to the transparent electroconductive layer and baking the coating so formed on the transparent electroconductive layer. Because of this, any adverse effect the glass substrate may bring about during the baking step can advantageously be eliminated and, therefore, the present invention is effective to provide the ECD device capable of exhibiting a high display definition.

Another feature of the present invention is the avoidance of the possible reduction in display definition of the ECD device which would occur as a result of difference in etching speed and/or blackening of the transparent electroconductive layer that may take place during the patterning by dry etching of the WO₃ layer formed either by the conventional vapor deposition method or by the coating-and-baking method according to the present invention. Therefore, the present invention is effective even in this aspect to provide the ECD device capable of exhibiting a high display definition.

Furthermore, according to the present invention, the following meritorious effects can be appreciated.

(1) A display area of the ECD device is constituted by a layered structure of substrate, transparent insulating layer and transparent electroconductive layer and the transmission of light incident to the ECD device and that of light reflected by the background plate or the white powder mixed in the electrolyte are improved, thereby enabling the manufacture of the ECD device capable of exhibiting a high display definition as well as a high contrast.

(2) The provision of the transparent insulating layer ensures a simple and ready removal of the baked residue during the formation of the material cabable of exhibiting the EC phenomenon by baking the coated layer of the coating solution, thereby enabling the manufacture of the ECD device capable of exhibiting a good display definition.

(3) Since the transparent electroconductive layer is rigidly secured to the transparent insulating layer, the bonding strength can be improved as compared with the conventional case wherein they are rigidly secured directly to the glass substrate.

(4) Since the display substrate is covered by the transparent insulating layer, even when the display substrate is made of, for example, soda-lime glass, any possible leach of alkaline metal ions, contained in the soda-lime glass into the substrate during the baking step can advantageously avoided, thereby eliminating any possible adverse influence on the EC reaction.

(5) The provision of the transparent insulating layer which is chemically and physically stable is effective to avoid any possible deposition of the transparent electroconductive layer and/or the EC material on the substrate and also to avoid any possible deterioration and/or corrosion of the substrate which would result from its contact with the electrolyte.

(6) Where, the EC layer is etched under a plasma atmosphere, since the display substrate is covered by the transparent insulating layer, there is no possibility of the EC layer contacting the soda-lime glass and a portion of EC material other than that above transparent electroconductive layer contacts the transparent insulating layer, the etching can be uniformly effected at a stable speed.

(7) Since etching irregularity does not take place, any possible blackening of the transparent electroconductive layer which would result when exposed to the plasma atmosphere for a prolonged period of time can advantageously be avoided.

Although the present invention has fully been described by way of example with reference to the accompanying drawings, it is to be noted that various changes and modifications are apparent to those skilled in the art. For example, although the present invention has been described as applied to display substrate where the transparent electroconductive layer is formed, the insulating layer may also be formed on the counter-substrate at a position between the counter substrate and electroconductive layer for an electrode in the case where the counter-substrate including the counter electrode layer thereon is desired to be workable as a display.

Such changes and modifications are, therefore, to be understood as included within the true scope of the present invention unless they depart therefrom.

We claim:

1. An electrochromic display device comprising a transparent substrate and a counter substrate sealingly joined together to define a cell therebetween; a transparent electroconductive layer arranged in a predetermined pattern on a surface of the transparent substrate facing the counter substrate; a display electrode layer overlaying said electroconductive layer and made of a material capable of exhibiting an electrochromic phenomenon; a counter electrode layer deposited on said counter substrate and facing said transparent substrate; an electrolyte filled in the cell; and transparent insulating layer means for improving display definition and contrast positioned between said transparent substrate and said transparent electroconductive layer said transparent insulating layer being comprised of silicon oxide and being about 1000 Å in thickness.

* * * * *